United States Patent
Smith et al.

(10) Patent No.: US 11,374,388 B2
(45) Date of Patent: Jun. 28, 2022

(54) PROTECTION ASSEMBLY FOR AN ELONGATE MEMBER DEPLOYED UNDERWATER

(71) Applicant: CRP Subsea Limited, Skelmersdale (GB)

(72) Inventors: Andrew Michael Smith, Skelmersdale (GB); Edmund John Deasey, Skelmersdale (GB); Marc Ian Reeves, Skelmersdale (GB); Austin Harbison, Skelmersdale (GB)

(73) Assignee: CRP Subsea Limited, Skelmersdale (GB)

( * ) Notice: Subject to any disclaimer, the term of this patent is extended or adjusted under 35 U.S.C. 154(b) by 332 days.

(21) Appl. No.: 15/780,425

(22) PCT Filed: Nov. 30, 2016

(86) PCT No.: PCT/GB2016/053758
§ 371 (c)(1),
(2) Date: May 31, 2018

(87) PCT Pub. No.: WO2017/093725
PCT Pub. Date: Jun. 8, 2017

(65) Prior Publication Data
US 2019/0214801 A1    Jul. 11, 2019

(30) Foreign Application Priority Data
Dec. 1, 2015  (GB) ...................................... 1521195

(51) Int. Cl.
*H02G 1/08*    (2006.01)
*F16L 1/12*    (2006.01)
(Continued)

(52) U.S. Cl.
CPC ............. *H02G 1/081* (2013.01); *F03D 80/85* (2016.05); *F16L 1/123* (2013.01); *F16L 5/00* (2013.01);
(Continued)

(58) Field of Classification Search
CPC .. E02B 2017/0095; F03D 80/85; F16L 1/123; F16L 57/005; F16L 57/02; H02G 1/081; H02G 1/10; H02G 9/025
(Continued)

(56) References Cited

U.S. PATENT DOCUMENTS 3,002,565 A * 10/1961 Moore, Jr. ............... E21B 23/02
166/217
4,563,032 A * 1/1986 Knowles ............. E21B 43/0135
294/90
(Continued)

FOREIGN PATENT DOCUMENTS

GB    2543574 A  *  4/2017   .............. F16B 7/042
GB    2543588 A  *  4/2017   .............. F16B 7/042
(Continued)

*Primary Examiner* — Robert K Arundale
*Assistant Examiner* — Richard K. Durden
(74) *Attorney, Agent, or Firm* — Cahn & Samuels, LLP

(57) ABSTRACT

A protection assembly for mounting in an underwater support structure includes at least one bend protection device coupled to a retaining device so that together they provide a through-going passage for receiving an elongate member which is to be protected. The elongate member passes through a support structure opening, and the retaining device is configured to be received in the support structure opening and to engage with the support structure to resist subsequent withdrawal from it. Installation of the protection assembly includes grasping the protection assembly with a releasable clamp, arranging a pulling line to pass through the support structure opening to the mechanical clamp and securing the pulling line to the mechanical clamp, drawing the retaining
(Continued)

device of the protection assembly into the support structure opening using the pulling line and engaging the retaining device with the support structure, and releasing the clamp from the protection assembly.

9 Claims, 16 Drawing Sheets

(51) Int. Cl.
    *F16L 5/00*     (2006.01)
    *H02G 1/10*     (2006.01)
    *F16L 57/00*     (2006.01)
    *F03D 80/80*     (2016.01)
    *H02G 9/12*     (2006.01)
    *H02G 9/02*     (2006.01)
    *E02B 17/00*     (2006.01)

(52) U.S. Cl.
    CPC ........ H02G 1/10 (2013.01); *E02B 2017/0095* (2013.01); *F05B 2240/913* (2013.01); *F16L 57/005* (2013.01); *H02G 9/02* (2013.01); *H02G 9/12* (2013.01)

(58) Field of Classification Search
    USPC .......................................................... 138/110
    See application file for complete search history.

(56) References Cited

U.S. PATENT DOCUMENTS

| | | | | |
|---|---|---|---|---|
| 4,684,161 | A * | 8/1987 | Egner | G02B 6/4439 |
| | | | | 254/134.3 FT |
| 4,714,380 | A * | 12/1987 | Coutarel | F16L 27/00 |
| | | | | 405/168.3 |
| 5,947,642 | A * | 9/1999 | Teixeira | E21B 19/004 |
| | | | | 405/195.1 |
| 7,387,469 | B2 * | 6/2008 | Duggan | F16L 1/20 |
| | | | | 405/211 |
| 2008/0087435 | A1 * | 4/2008 | Reddy | F16L 37/144 |
| | | | | 166/343 |
| 2008/0142106 | A1 | 6/2008 | Berland | |
| 2008/0286051 | A1 * | 11/2008 | Duggan | F16L 1/036 |
| | | | | 405/184 |
| 2011/0226527 | A1 * | 9/2011 | Ritchie-Bland | F16L 57/02 |
| | | | | 174/669 |
| 2012/0168172 | A1 * | 7/2012 | Litherland | F16L 1/15 |
| | | | | 166/367 |
| 2017/0159373 | A1 * | 6/2017 | Duggan | E21B 43/0107 |
| 2018/0034254 | A1 * | 2/2018 | Thomson | H02G 3/22 |
| 2018/0306222 | A1 * | 10/2018 | Preston | F03D 80/00 |

FOREIGN PATENT DOCUMENTS

| | | |
|---|---|---|
| WO | 2008/139190 A1 | 11/2008 |
| WO | 2008151660 A1 | 12/2008 |
| WO | 2010/038056 A2 | 4/2010 |
| WO | 2010/047584 A2 | 4/2010 |

* cited by examiner

PROTECTION ASSEMBLY FOR AN ELONGATE MEMBER DEPLOYED UNDERWATER This application is the National Stage of International Application No. PCT/GB2016/053758, filed on Nov. 30, 2016, which claimed the benefit of Great Britain Application No. 1512195.6 filed Dec. 1, 2015, which are hereby both incorporated by reference.

The present invention relates to protection of an elongate flexible member passing through an opening in a support structure underwater.

There are various practical situations in which a substantial but to some degree flexible elongate member such as a power cable, an umbilical, or a pipeline needs to be routed along the seabed to enter some support structure through an opening in it.

The invention is applicable in particular—but by no means exclusively—to protection of electric cables used in transmission of power from wind turbines. In an offshore wind farm, substantial electric cables typically run on the sea-bed from individual turbines to a collection station, which receives power from multiple turbines, and a further cable transmits power onward from the collection station to some shore-bound installation. Note that the term "offshore" is used herein to refer to an installation which is in water, but does not imply any particular distance of that installation from land, and should be understood to include installations in any body of water including a lake or river and not only the sea.

Certain technical challenges arise in this connection:
1. provision needs to be made for installation of the cable—that is, for drawing it into the turbine's supporting structure
2. the cable needs to be protected from damage during installation, in a potentially hostile environment. Turbines are for example often surrounded by rock dumps serving to protect the turbine's monopile foundations
3. the cable needs to be protected from subsequent damage during its design lifetime. In particular, it needs to be protected from damage by over-bending. Movement due for example to water flow over the cable could—if the cable were unprotected—lead to excessive local curvature, especially in the region where the cable emerges from the turbine's supporting structure.

It is known to protect elongate members deployed underwater from over-bending by use of (a) bend stiffeners and (b) bend restrictors. A bend stiffener is a long sleeve to be placed around the elongate member, often of frusto-conical shape, which has a degree of flexibility but which is stiff enough to prevent the elongate member within from suffering an excessively tight radius of curvature. A bend restrictor is typically a set of components joined to each other in a linear chain through joints which permit a limited range of angular movement of one component relative to its neighbour. The components together form a continuous passage through which the elongate member is passed. Because of their limited range of angular movement they prevent excessively tight curvature.

In some cases the elongate member may be led into the support structure through a rigid tube—an "I" tube or a "J" tube. For an example of an installation using a J-tube in relation to wind turbine cables, and an account of the problems involved in protecting the cable where it emerges from the J tube, refer to WO2008/151660, Vestas Wind Systems A/S. An example of an installation using an I-tube is provided by WO2008/139190, Blue Ocean Products Ltd. This describes a connector which surrounds the cable and is used in its installation. The connector is to be pulled into the I-tube and form a push-fit engagement with it, to maintain itself in position. It carries a form of bend restrictor to protect the cable in the vicinity of the I-tube.

J-tubes and I-tubes are not desirable in some installations, since they can for example be vulnerable to damage during installation of the turbine if pre-fitted, and expensive to install post-installation.

An alternative approach—dispensing with the need for a J or I-tube—is to lead the cable through an opening in the wall of the support structure. An example of this, and a known means of protecting a cable in this context, is disclosed in WO2010/038056 (Tekmar Energy Ltd.). This document describes a cable protection assembly having, in a linear sequential arrangement:
 i. a first bend stiffener to be deployed inside a turbine's support pillar;
 ii. a mechanical latch formed as a cylinder with outwardly projecting spring-biased fingers. The mechanical latch is to be received in and to engage with an opening in the wall of the support pillar through which the cable enters. Once it has been pulled into the opening, the mechanical latch's fingers prevent it from being withdrawn;
 iii. a second bend stiffener coupled to the latch; and
 iv. a segmented bend restrictor coupled to the second bend stiffener.

To facilitate installation of this cable protection assembly, the first bend stiffener incorporates ropes attached at one end of the bend stiffener to a threaded steel insert used to couple it to the mechanical latch and extending through its polymer body to emerge at its free end, where loops are formed in the ropes to engage with a pulling line used to draw the assembly into the wind turbine structure. When the mechanical latch has been drawn as far as it can into the turbine structure it ceases to move along with the pulling line and the resultant increase of line tension causes break-off wires in this vicinity to release, freeing the pulling line from the cable protection assembly which is subsequently held in place by the fingers of the latch mechanism. The pulling line is additionally attached to the cable, so that by continuing to draw in the pulling line the cable can then be pulled though the cable protection assembly and into the turbine structure, to some point of electrical connection to the turbine's generator.

Running the ropes through the polymer body of the first bend stiffener is undesirable in that it can make the stiffener's properties asymmetric, being stiffer against bending in one plane than another. The lines can also create stress concentrations in the stiffener, which is a potentially important issue in terms of design lifetime since the installations in question need to survive for long periods with minimal maintenance and can be subject to a number of bending cycles and prolonged high curvature.

There is a concern relating to the use of break-off cables in the vicinity of the cable, since their release under considerable tension may cause damage. Where shear pins or other breakable elements are used to cause pulling line release it is important to ensure that their broken edges cannot cause cable damage and that any fragments do not find their way into the bend stiffener assembly.

There is also a need to protect the end of the cable protection assembly as it is drawn into position along the seabed. Ingress of foreign matter—sand, stones or anything else—needs to be prevented since such matter could cause cable damage. The leading end of the cable protection assembly is especially vulnerable to damage as it is drawn over the sea bed, or for example over rock dumps placed in the vicinity of the turbine leg. If the cable is pre-installed in the cable protection assembly then it too needs to be protected from damage during installation if its tip extends out of the assembly.

According to a first aspect of the present invention there is a method of installing a protection assembly in an underwater support structure, the protection assembly comprising at least one bend protection device coupled to a retaining device, the bend protection device and the retaining device together providing a through-going passage for receiving an elongate member which is to be protected, the support structure having an opening through which the elongate member is passed, and the retaining device being configured to be received in the opening in the support structure and to engage with the support structure to resist subsequent withdrawal from it, the method comprising:

grasping an end portion of the protection assembly with a releasable clamp, arranging a pulling line to pass through the opening in the support structure to the mechanical clamp and securing the pulling line to the mechanical clamp, drawing the retaining device of the protection assembly into the opening in the support structure using the pulling line and engaging the retaining device with the support structure, and releasing the clamp from the protection assembly.

By using a releasable mechanical clamp to grasp the assembly and link it to the pulling line, the invention makes it possible to avoid reliance on a weak link in the pulling line itself. Instead a secure mechanical linkage to the assembly can be made and—at the appropriate time—released. The clamp may for example be hydraulically operated, or it may itself be configured to mechanically release in response to line tension above a certain threshold.

According to a second aspect of the present invention there is a protection assembly to be deployed underwater to protect an elongate member passing through an opening in a support structure, the protection assembly comprising:
  a bend protection device,
  a retaining device which is coupled to the bend protection device and is configured to be received in the opening in the support structure and to engage with the support structure to resist subsequent withdrawal from it, and
  an engagement feature configured to be releasably grasped by a mechanical clamp to facilitate attachment of a pulling line to the protection assembly.

A further aspect of the present invention relates to the manner in which the assembly is retained to the support structure.

According to this third aspect of the present invention there is a protection assembly to be deployed underwater to protect an elongate member passing through an opening in a support structure, the protection assembly comprising:
  a bend protection device and
  a retaining device which is coupled to the bend protection device and is configured to be received in the opening in the support structure and to engage with the support structure to resist subsequent withdrawal from it, wherein the retaining device comprises
    a retainer body for receipt in the opening in the support structure,
    a coupling element for coupling to the bend protection device, the coupling element being carried by the retainer body and movable outwardly and inwardly with respect to it,
    an engagement member which projects from the retainer body and is movable inwardly and outwardly with respect to it to engage the periphery of the opening in the support structure, and
    an engagement mechanism though which an outwardly directed force applied to the coupling gives rise to an outwardly directed force upon the engagement member, so that pulling on the coupling element urges the engagement member into engagement with the periphery of the opening to secure the retaining device in the support structure.

The engagement mechanism may in this way be configured to automatically engage the support structure following its insertion in the opening. It can be configured to grip the support structure with a force that increases as pull on the device increases, making a secure mounting for the assembly. The coupling can be arranged to carry weight of the bend protection device following installation of the protection assembly, so that that weight pulls on the coupling and urges the engagement member outward.

A further aspect of the present invention relates to moulded polymer bend stiffeners. According to a fourth aspect of the present invention there is a bend stiffener comprising an elongate bend stiffener body which comprises a polymer moulding having two ends and which provides a through-going channel extending from one end to the other for receipt of an elongate member, wherein the bend stiffener body is provided at both ends with a respective coupling suitable for attachment to another bend stiffener.

In this way multiple identically formed bend stiffeners can be attached to one another in a chain of a chosen length, avoiding any need to manufacture and transport excessively long moulded items.

Specific embodiments of the present invention will now be described, by way of example only, with reference to the accompanying drawings, in which.

The embodiment to be described herein is a protection assembly 10 to be used where some form of elongate member capable of flexure enters a support structure. It is especially suited to use underwater in connection with an elongate member deployed on the seabed (and since the invention can be used in bodies of water other than the sea, including fresh water rivers or lakes, for example, the term "seabed" must be understood to be used here—for the sake of brevity—in a sense which encompasses the floor of any such body of water including a lake bed or river bed). The protection assembly 10 serves to provide the elongate member with protection against physical damage in the region where it enters the support structure. This includes protection against damage by over-bending, but also against abrasion and against impacts. Note that it may for example be necessary on occasion to dump rocks on the sea bed after cable installation, e.g. in response to scouring of the sea bed. Such dumps could damage an unprotected cable. There are other sources of potential impact damage such as ships' anchors.

The protection assembly 10 also serves to facilitate the process of drawing the elongate member into the support structure during its installation.

Figure 1A:
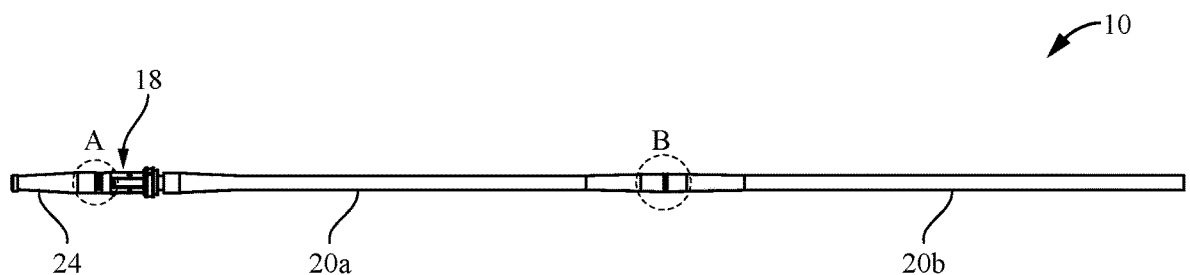
FIG. 1a is a side view of a protection assembly for an elongate member embodying the present invention.
Figure 2:
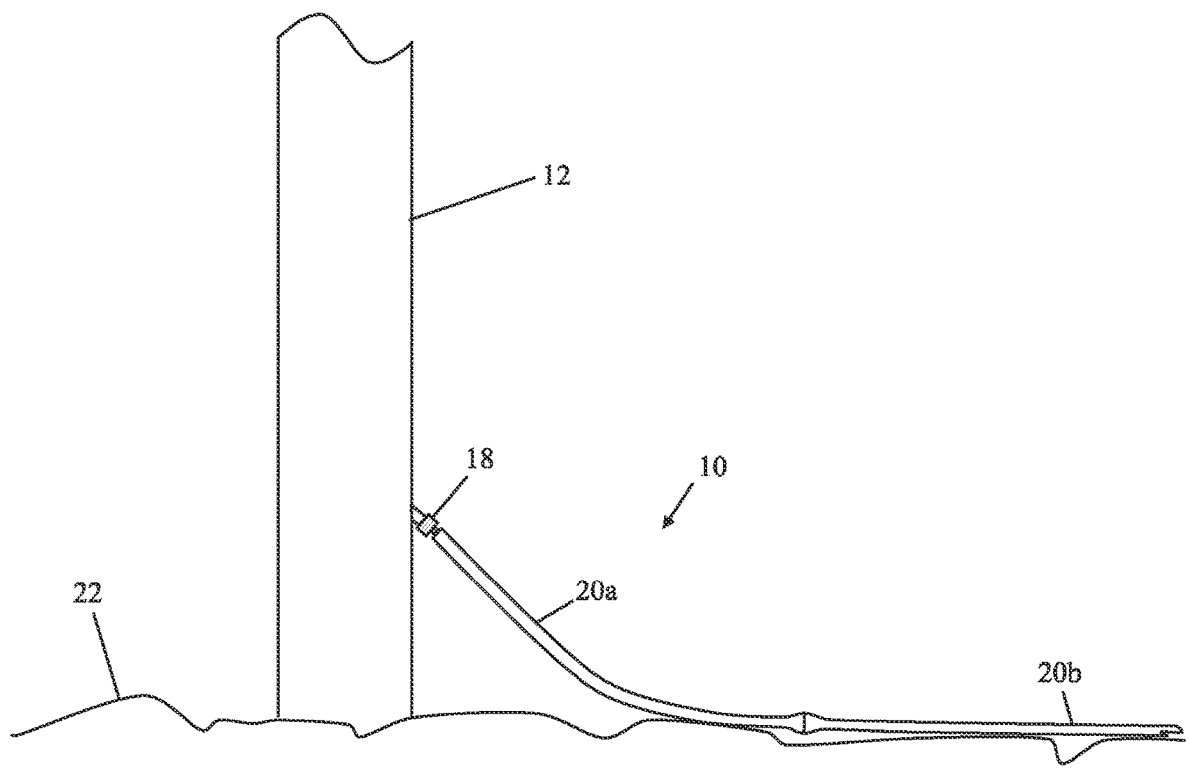
FIG. 2 is a somewhat stylised side view of a protection assembly embodying the present invention deployed in relation to a wind turbine support structure at sea.
Figure 3:
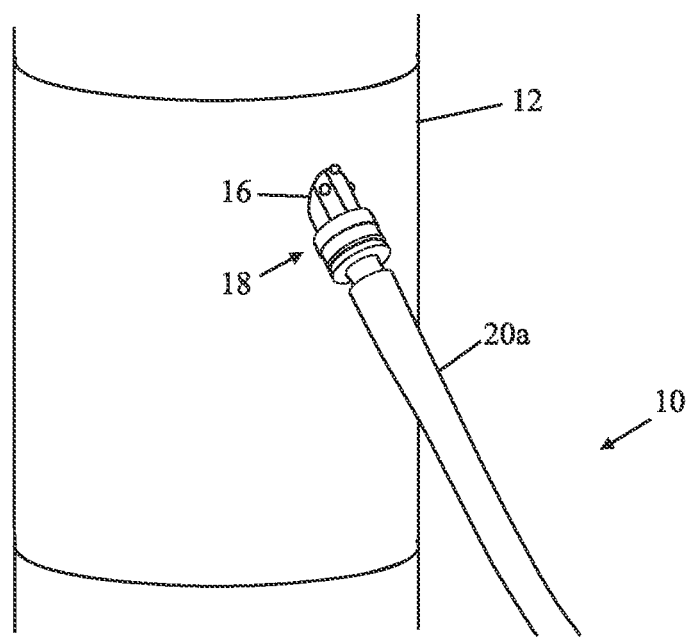
FIG. 3 is a further view of the same installation.

FIG. 1a shows the entire protection assembly 10 and FIGS. 2 and 3 show it deployed upon a support structure in the form of a leg 12 of a wind turbine. As is well known, modern offshore wind turbines typically have a single upright tubular leg 12 mounted e.g. through a monopile driven into the seabed. In the installation depicted in FIGS. 2 and 3 an electrical cable, which is not seen in these drawings but is within the protection assembly 10, passes into the turbine leg 12 through an opening in the leg's tubular wall. The periphery of this opening can be seen in FIG. 3 at 16. The opening 16 faces in a downwardly inclined direction. The protection assembly 10 comprises a retaining device 18 which is received in the opening 16 and which— by engagement with its periphery, in a manner to be explained below—serves to retain the protection assembly in place. Coupled to the retaining device 18 is an external bend stiffener arrangement which in this embodiment comprises first and second external bend stiffeners 20a, 20b. Due to the downward inclination of the opening 16, and its own stiffness, the bend stiffener leads in a natural curve down to the sea bed 22 without excessive curvature of the cable within.

Looking at FIG. 1a, the protection assembly comprises, in a linear arrangement and in the following sequence:

an internal bend stiffener 24 which is disposed within the leg 12 in use;

the retaining device 18;

the first external bend stiffener 20a; and the second external bend stiffener 20b.

These parts together form a continuous through-going passage for receiving and protecting the cable.

Figure 4A:
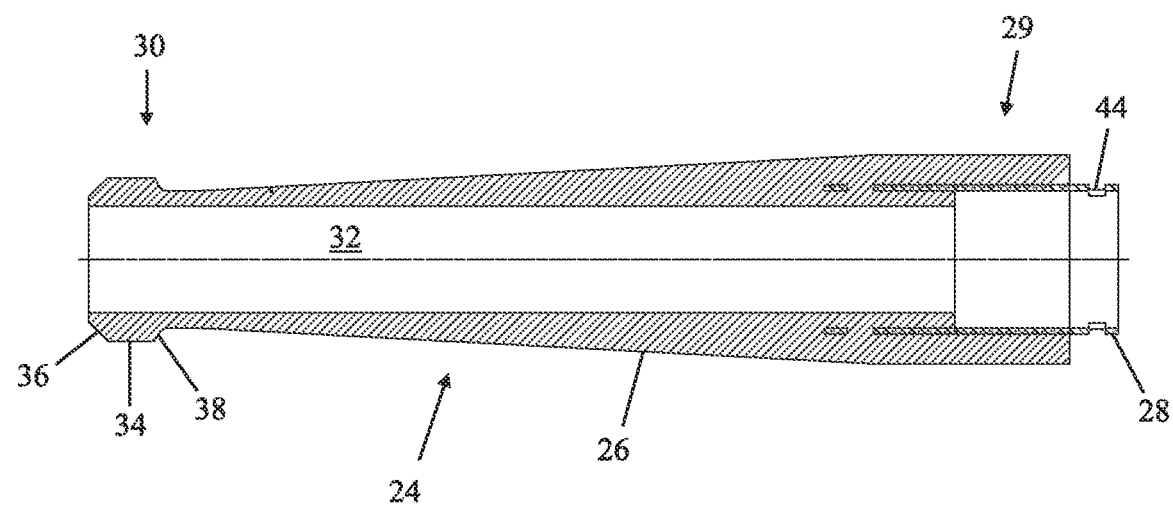
FIG. 4a is a section taken in an axial plane through an internal bend stiffener of the FIG. 1 embodiment.
Figure 4B:
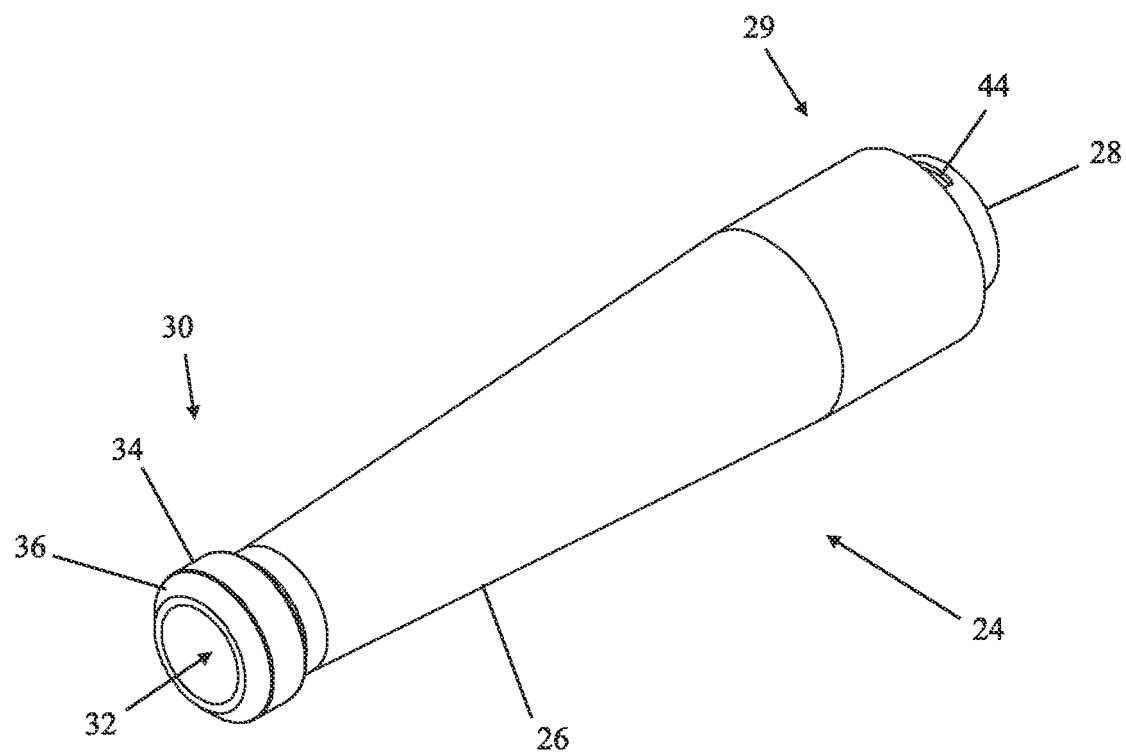
FIG. 4b is a further view of the internal bend stiffener.

The internal bend stiffener 24 is best seen in FIGS. 4a and 4b. This part is referred to as "internal" simply because it is disposed within the leg 12 of the turbine once installed. It serves to prevent excessive curvature of the cable where it emerges from the retaining device 18. In the present embodiment the internal bend stiffener 24 comprises an internal stiffener body 26 and an internal stiffener coupling 28. The internal stiffener body 26 is a unitary polymer moulded item in the present embodiment with a generally frusto-conical shape tapering inwardly from a root end 29 to a free end 30. It has enough flexibility to bend somewhat along with the cable, particularly toward its narrower free end 30, to avoid excessive local curvature of the cable where it emerges from the free end, but is also sufficiently rigid to prevent excessively tight curvature of the cable protected within a through-going passage 32 of circular sectional shape. The material of the internal stiffener body 26 is a resilient polymer, specifically polyurethane. At or toward the free end 30, the internal stiffener body has a shaped engagement feature to engage with a releasable pulling clamp. In the present embodiment this takes the form of an integrally formed collar 34. This is a region of enlarged diameter with a chamfered outer end 36 and an engagement shoulder 38.

Figure 5A:
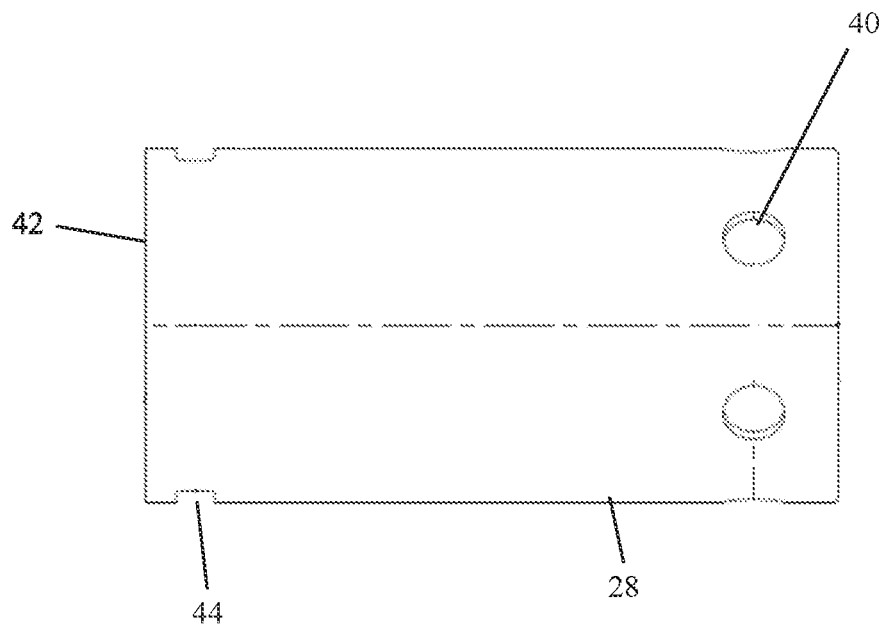
FIG. 5A is a view along a radial direction of a stiffener coupling part of the FIG. 1 embodiment.
Figure 5B:
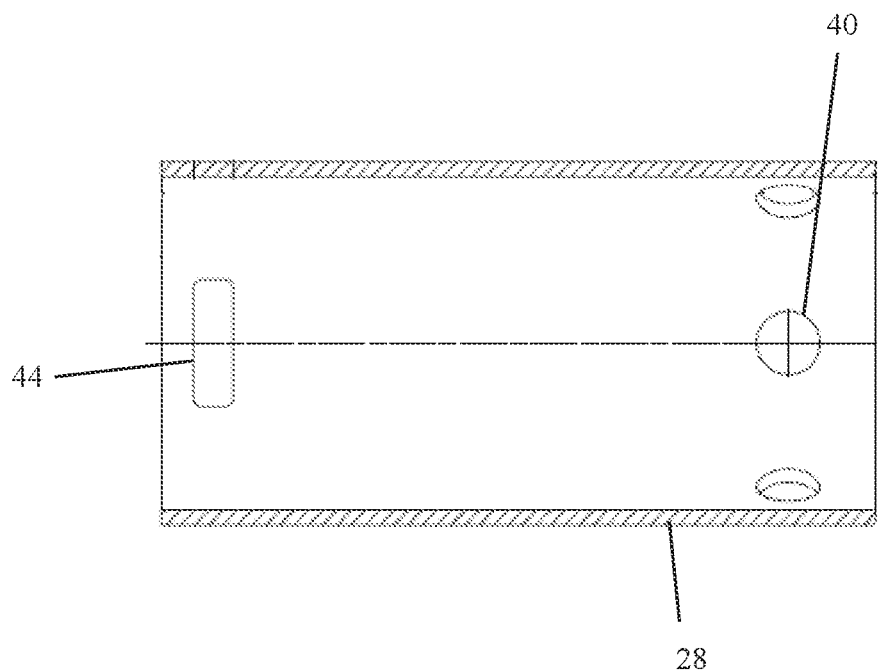
FIG. 5b is a section in an axial plane through the stiffener coupling part.

The internal stiffener coupling 28 is depicted on its own in FIGS. 5a and 5b and in this embodiment it comprises a metal cylinder which is embedded in the internal stiffener body 26. This is achieved by having the internal stiffener coupling 28 protrude into the mould used to make the internal stiffener body 26, so that the material of the body surrounds and secures the coupling. Toward one end the internal stiffener coupling 28 has cut-aways 40 formed in the present embodiment as round openings. The polymer material of the internal stiffener body 26 passes through these openings which thus help to ensure a secure engagement of these two parts. The other end 42 of the internal stiffener coupling 28 projects from the internal stiffener body 26 and has coupling features to enable it to be coupled to the retaining device 18. In the present embodiment these take the form of openings, more specifically slots 44, in the part's cylindrical wall. There are two of these slots 44 in the present embodiment.

The retaining device 18, best seen in FIG. 6, has a first coupling element 46 configured to engage the internal stiffener coupling 28 in order to couple the retaining device 18 and the internal bend stiffener 24 together. The first coupling element 46 comprises a tubular spigot projecting from an end of the retaining device 18 and having coupling features formed in the present embodiment as slots arranged so that when the first coupling element 46 is inserted into the internal stiffener coupling 28 the slots 44, 48 of these two parts are able to be aligned. The coupling is then secured by means of a locking collar depicted in FIGS. 7a and 7b.

Figure 7A:
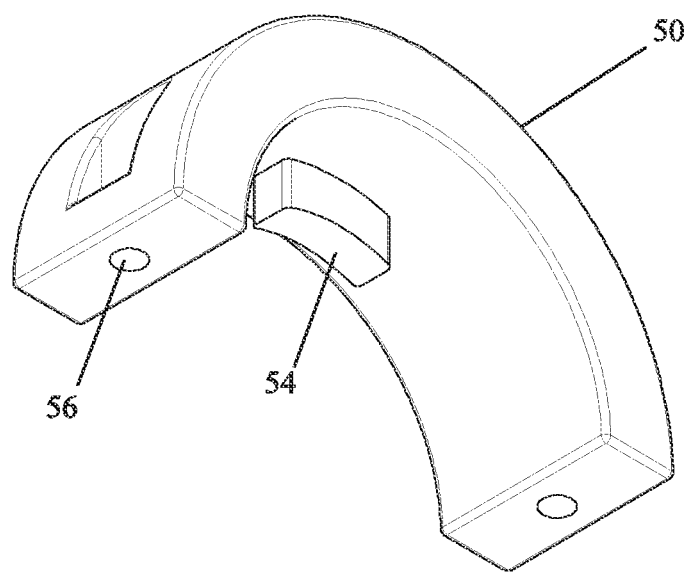
FIG. 7a depicts a collar used in the FIG. 1 embodiment.
Figure 7B:
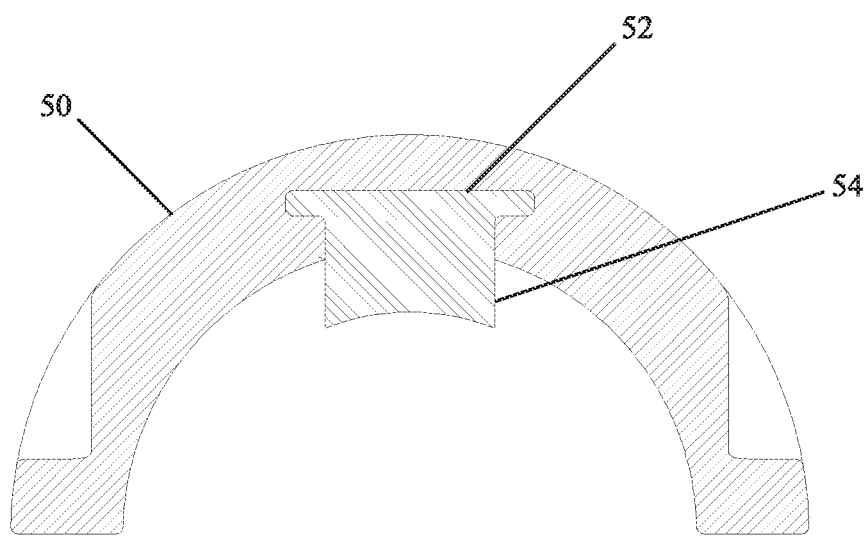
FIG. 7b is a section through the collar part.

In the present embodiment the locking collar comprises two semi-annular collar parts 50, which can be identically formed and only one of which is seen in FIGS. 7a and 7b.

Figure 1B:
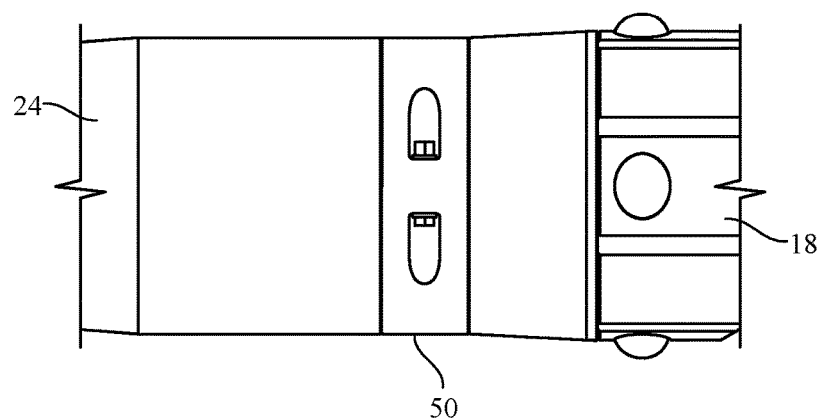
FIG. 1b is an enlarged side view of parts of the protection assembly in circle A of FIG. 1.

Embedded in the collar part 50 is a locking dog 52. In the present embodiment the collar parts 50 comprise moulded polymer, specifically polyurethane. The locking dog 52 is metal and has a "T" shape whose cross-bar head is embedded in the collar part 50. The remainder 54 of the locking dog 52 projects radially inwardly from the collar part 50. In use, this part 54 extends through the slots 44, 48 of the internal stiffener coupling 28 and the first coupling element 46 to secure these parts together. One collar part 50 is secured to the other collar part 50 using threaded fasteners passed through aligned bores 56 in the two parts to keep the whole coupling in place—see FIG. 1*b*.

Figure 7C:
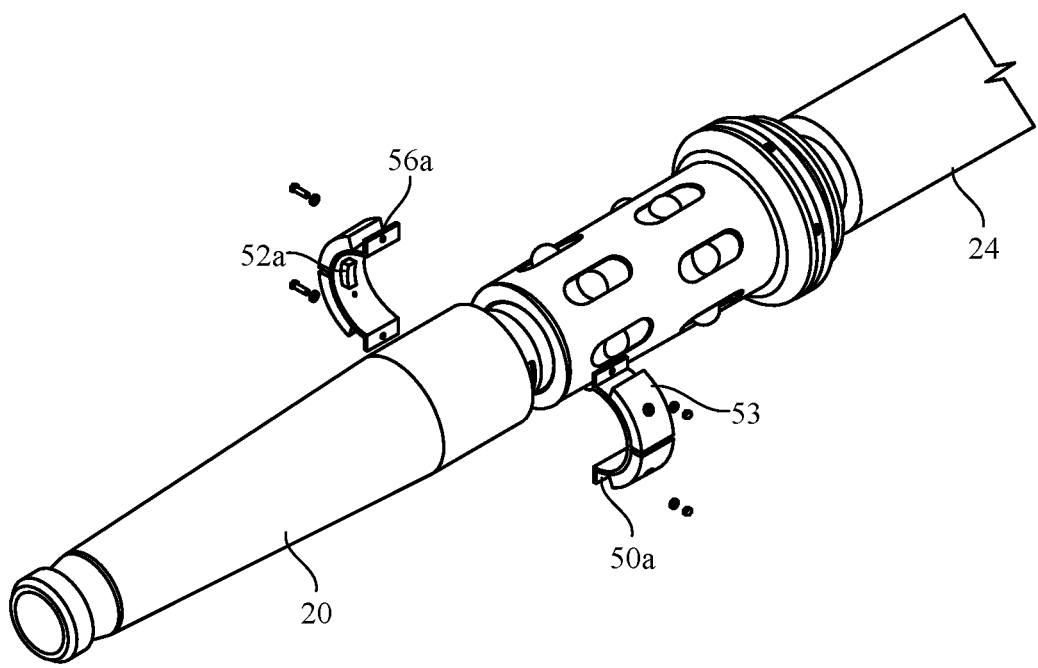
FIG. 7c depicts an alternative version of the collar part, along with other components.

An alternative embodiment of the locking collar is depicted in FIG. 7*c* and uses collar parts 50*a* formed of metal, and specifically of stainless steel in the present embodiment, each bearing a respective locking dog 52*a*. The metal collar parts 50*a* can be of a low profile, leaving space around them for sacrificial anodes 53 which provide protection for other metal parts against galvanic corrosion.

The retaining device 18 comprises a mechanism which engages with the periphery 16 of the opening in the turbine leg 12 to secure the device in position in the leg. This mechanism can act automatically, so that once the retaining device 18 has been drawn into the opening in the leg it automatically makes the necessary engagement and secures the protection assembly 10 in place. In the present embodiment the mechanism is of ball and ramp type.

Figure 6A:
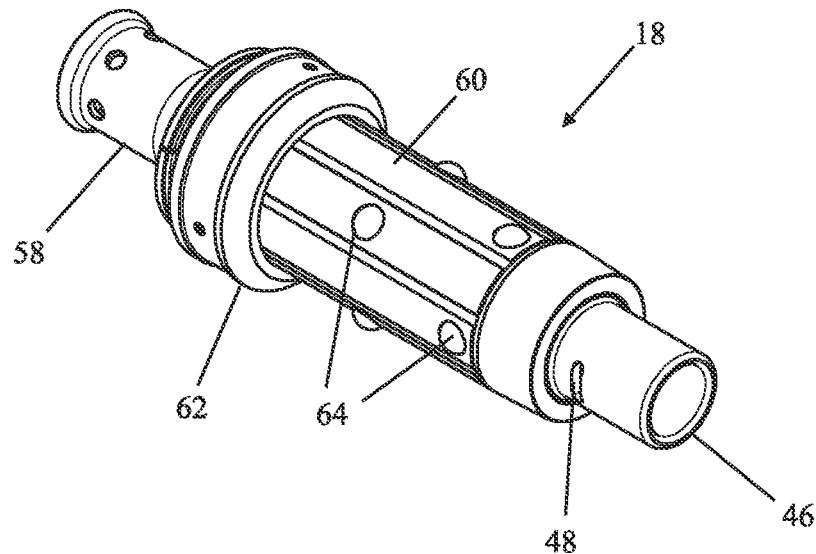
FIGS. 6a and 6b are views from different directions of a retaining device of the FIG. 1 embodiment.
Figure 6B:
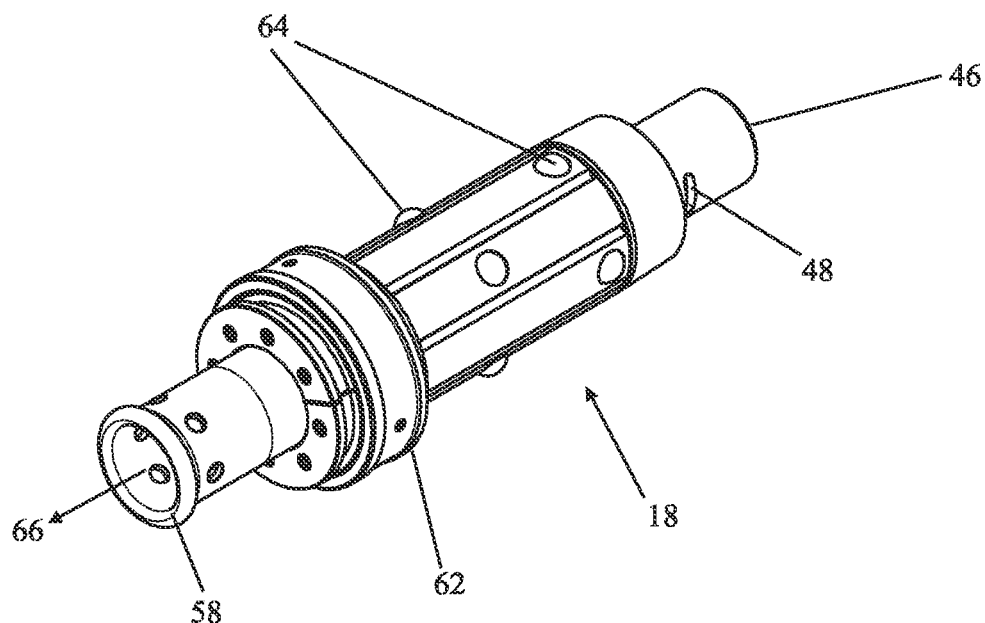

With reference to FIGS. 6*a* and 6*b*, the retaining device 18 has at one of its ends the aforementioned first coupling element 46 for coupling to the internal bend stiffener 24. At its other end it has a second coupling element 58 which, as will be explained below, makes a coupling to the first external bend stiffener 20*a*. Between the first and second coupling elements 46, 58 is a roughly cylindrical retainer body 60 sized for receipt in the opening 16 in the turbine leg, and an abutment in the form of a stop collar 62 which is too large to be drawn into the opening 16. Movable engagement members in the form of captive locking balls 64 protrude radially outwardly from the retainer body 60 and are movable radially by a ramp mechanism. Ball and ramp mechanisms are known in the art and the details of this mechanism are not shown herein, but briefly to explain the principle, the second coupling element 58 which bears at least part of the weight of the external bend stiffener 20 is movable along the axial direction (see arrow 66 in FIG. 6*b*) and is connected to a part or assembly within the retainer body 60 having inclined, radially outwardly facing surfaces on which the balls 64 run. Pulling the second coupling element 58 along the axially outward direction 66 relative to the retainer body 60 causes the inclined surfaces to move past the balls, driving them outwardly. In this way the balls can be made to frictionally engage with a surface surrounding the retainer body 60. In this case the surface in question is the periphery 16 of the opening in the turbine leg 12. The effect is that once the retainer body 60 has been received in the opening 16, the balls engage the periphery of the opening and automatically resist withdrawal of the retainer device. The weight of the external bend stiffener 20*a*, 20*b* is at least partly carried by the second coupling element 58, so that it serves to urge the balls 64 outward into engagement with the opening 16. The greater the force applied to the second coupling element 58 tending to withdraw the retainer, the greater is the force exerted by the balls to resist such withdrawal. Hence the protection assembly can be securely maintained in position.

The stop collar 62 is in this embodiment a sacrificial anode intended to corrode in preference to other metal parts of the retaining device 18. The corrosion of the stop collar is not problematic because it is required only during installation of the retaining device 18. After installation it is expected that the force on the retaining device 18 will always be in a direction tending to withdraw the retaining device 18, and the stop collar 62 plays no part in resisting this force. Nonetheless in other embodiments the stop collar 62 may be otherwise designed, to survive through the assembly's design lifetime.

The illustrated retaining device 18 is releasable, so that it can be disengaged from the turbine leg when needed.

Figure 8A:
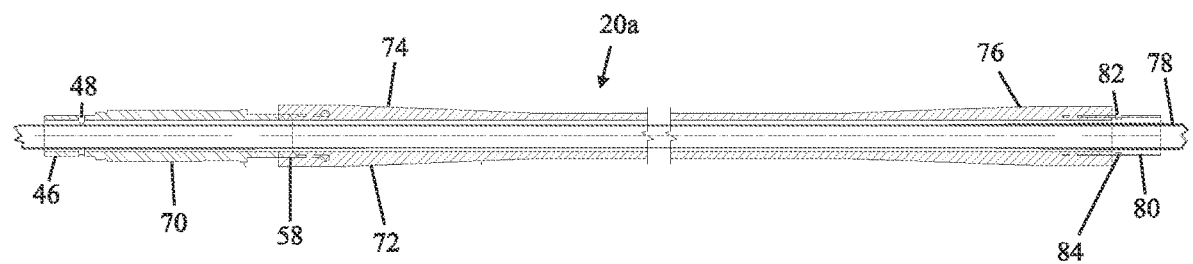
FIG. 8a is a section in an axial plane through a bend stiffener assembly forming part of the FIG. 1 embodiment.
Figure 8B:
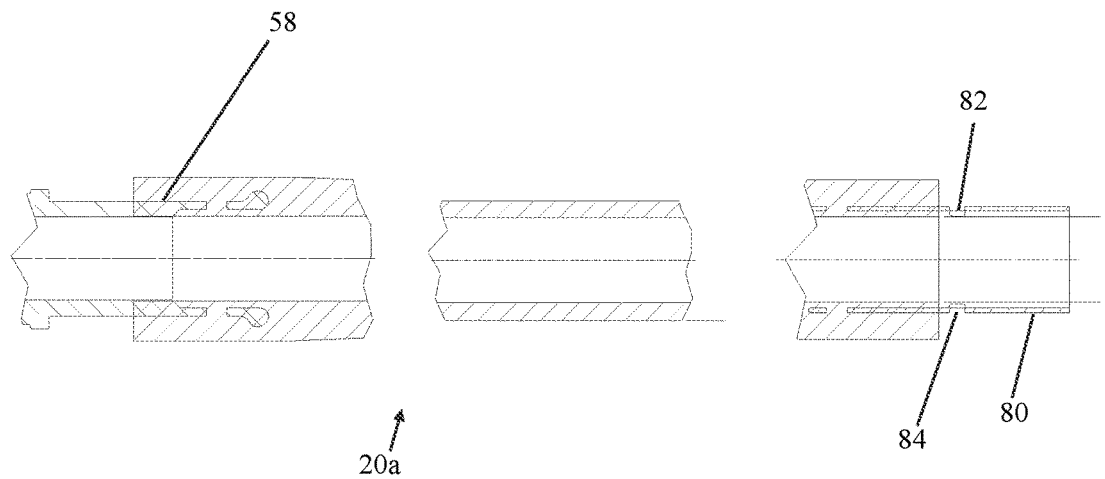
FIG. 8b shows parts of the same assembly to an enlarged scale.

As mentioned above, the external bend stiffener is formed in the present embodiment of multiple bend stiffener parts 20*a*, 20*b* joined end-to-end. FIGS. 8*a* and 8*b* show the first external bend stiffener 20*a* and its steelwork. In FIG. 8*a* it can be seen that the first coupling element 46 is integrally formed with the second coupling element 58, being coupled to it through a tubular mandrel 70. This mandrel passes through the retainer body 60 and is movable somewhat along it in the axial direction to enable operation of the ball and ramp mechanism. The second coupling element 58 is embedded in first external bend stiffener body 72 (which is referred to as "external" simply because it lies outside the turbine leg 12 in use). This embedment is achieved by having the second coupling element 58 protrude into the mould used to form the first external bend stiffener body 72 during the moulding process. The first external bend stiffener body 72 is an elongate tubular component designed to have sufficient rigidity to prevent excessively tight bending of the cable running through it. It has outwardly tapered portions 74, 76 leading to both its ends and an elongate central portion of constant diameter.

The cable itself in included in FIG. 8*a* as item 78.

At its end remote from the retaining device 18, the first external bend stiffener 20*a* has a first external stiffener coupling 80 for coupling to the second external bend stiffener 20*b*. The first external stiffener coupling 80 is formed in similar manner to the internal stiffener coupling 28 depicted in FIG. 5, as a metal cylinder with slots 82, 84.

Figure 1C:
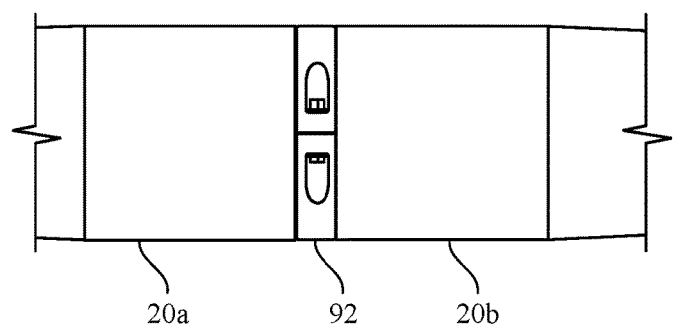
FIG. 1c is an enlarged side view of parts of the protection assembly in circle B of FIG. 1.
Figure 9:
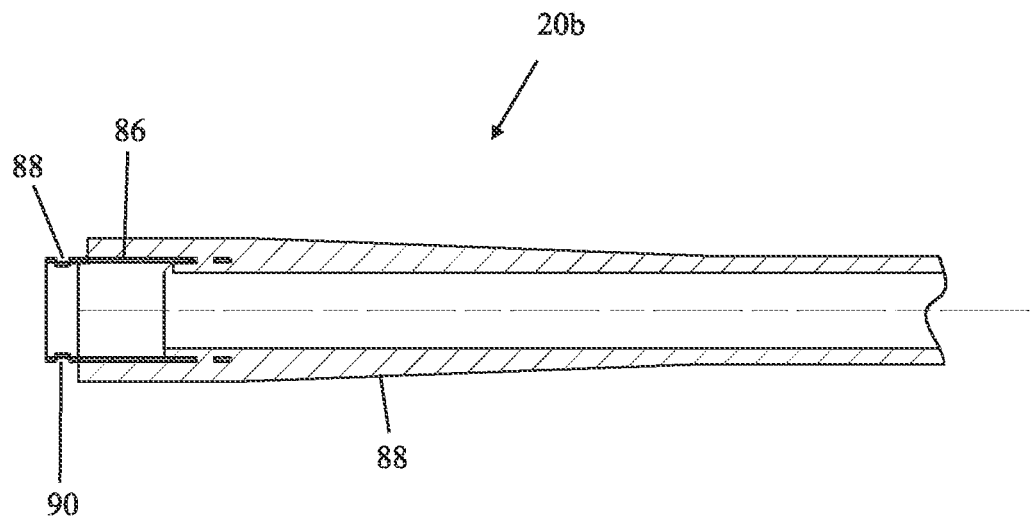
FIG. 9 is a section in an axial plane through a bend stiffener used in the FIG. 1 embodiment.
Figure 10:
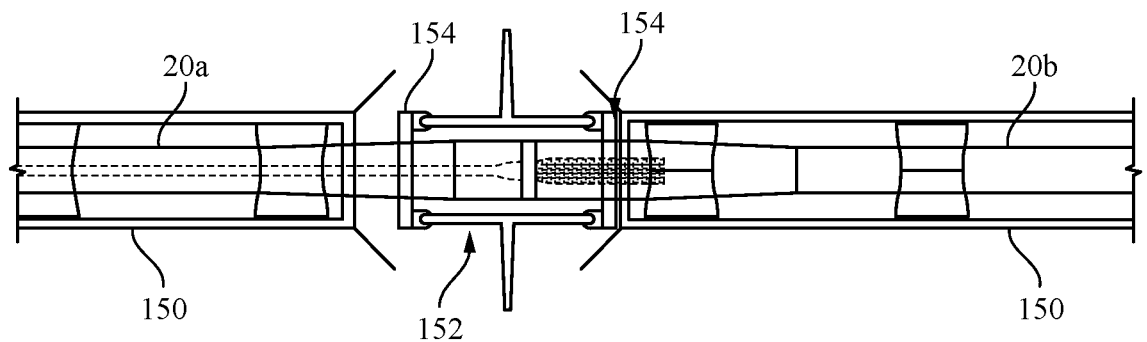
FIG. 10 is a view from above of two bend stiffener parts embodying aspects of the present invention during a process in which one is assembled to the other.

FIG. 9 shows the second external bend stiffener 20*b*, which has a second external stiffener coupling 86. This is similarly formed to the first external stiffener coupling 80, being embedded in second external bend stiffener body 88 but protruding from it, and having in its protruding portion slots 88, 90. The second external stiffener coupling 86 is however larger in diameter than the first external stiffener coupling 80, so that the former can receive the latter and be locked to it by means of a locking collar 92 (see FIG. 1*c*) formed by two collar parts similar to those seen in FIGS. 7*a*-7*c* and having locking dogs to engage the slots 82, 84, 88, 90. Thus the first and second external stiffener couplings 80, 86 are of two different types, one being engageable with the other. They may be referred to as "male" and "female" since one is receivable in the other. While in the present embodiment the second coupling 86 receives the first coupling 80, this could be reversed so that the first coupling 80 is larger than and receives the second coupling 86.

Only one end of the second external bend stiffener 20*b* is seen in FIG. 9 but in some embodiments the other end carries a further external stiffener coupling identically formed to the first external stiffener coupling 80, to engage with still a further, identically formed, external bend stiffener. Hence a chain of bend stiffeners of any chosen length can be formed by use of multiple such repeating units. This is highly advantageous since the moulding process, and other practical considerations including transportation, impose a practical limit on the length of bend stiffener that can be manufactured and handled in one piece. The use of a bend stiffener that has a male coupling at one end and a female coupling at its other end, as here, alleviates such problems. In particular, the bend stiffener parts 20a, 20b may be of a suitable length for packing in a conventional shipping container. Multiple such parts may be packed and transported in a single container.

Figure 11:
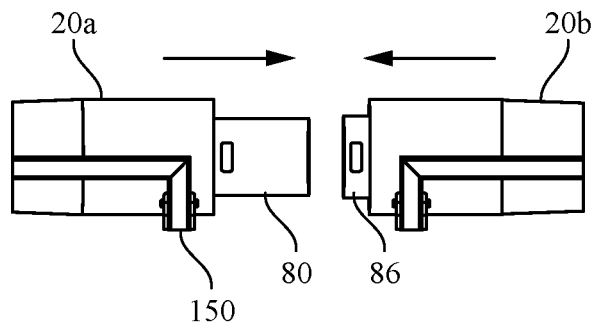
FIGS. 11 and 12 shows the same bend stiffener parts viewed from one side during the assembly process.
Figure 12:
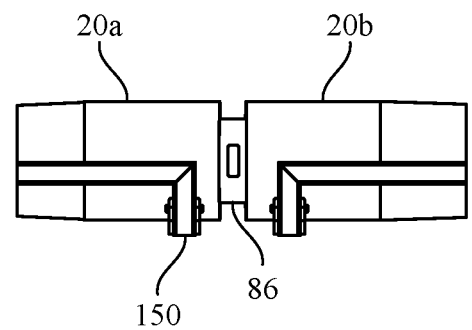
Figure 13:
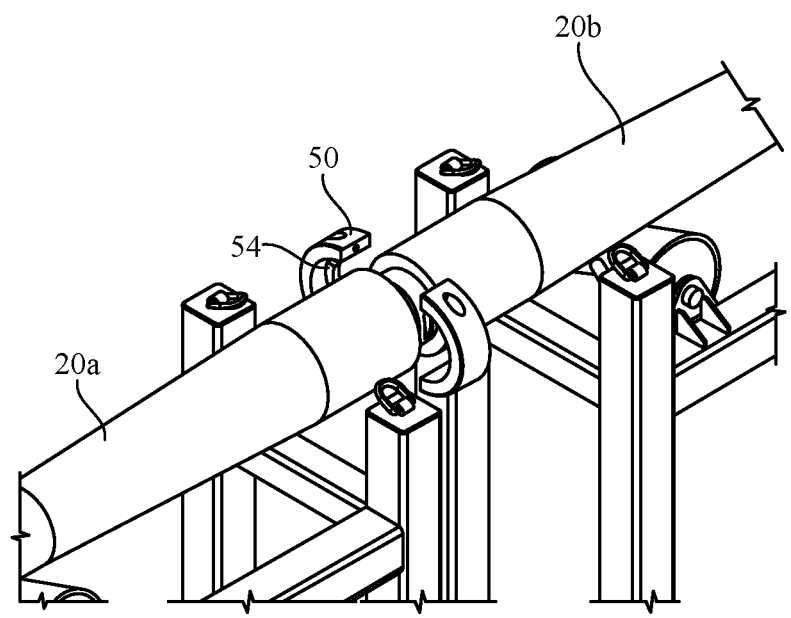
FIG. 13 is a view from above and one side of the same bend stiffener parts being coupled together using a clamp.

The process by which the bend stiffener parts 20a, 20b are assembled to one another is represented in FIGS. 10 to 13. It may be carried out on land, with the bend stiffener then being reeled ready for deployment, or it may be carried out on the deck of a floating craft or other structure from which the bend stiffener is to be deployed. The bend stiffener parts 20a, 20b are supported, with their axes aligned, upon cradles 150, onto which they are placed using a crane. The cradles 150 allow the bend stiffener parts to be turned, to bring the slots 82, 84 of one bend stiffener part into angular alignment with the slots 88, 90 of the other. They may be provided with support rollers that carry the bend stiffener parts, for this purpose. Once the slots are suitably aligned, the bend stiffener parts 20a, 20b are drawn together using, in this example, tension devices in the form of ratchet load binders 152, acting through removable split installation collars 154 applied to the bend stiffener parts (see FIG. 10 in particular). FIGS. 11 and 12 show the bend stiffener parts respectively before and after they have been brought together, the first external stiffener coupling 80 being received in the second external stiffener coupling 86. In FIG. 13, the parts 50 of the locking collar are being assembled around the resultant coupling to lock it together. The first and second external bend stiffeners 20a, 20b provide not only a degree of resistance to over-bending but also protection against abrasion and impacts. They can be flexible enough to be wound onto a reel. Thanks to the form of their couplings, they can be used to provide a sleeve/cladding of arbitrary length, and so substitute e.g. for the type of segmented cable protection cladding disclosed in GB2260590.

Figure 14:
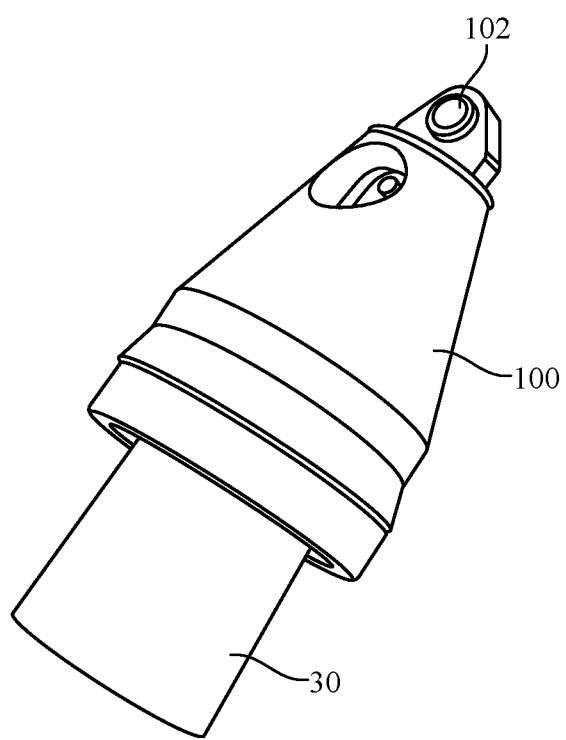
FIG. 14 depicts a clamp used with the FIG. 1 embodiment.

FIG. 14 shows a clamp 100 holding free end 30 of the internal bend stiffener 24. The clamp releasably engages with the engagement feature of the internal stiffener body 26, and more specifically with its engagement shoulder 38 (see FIG. 4). It may for example do so by means of dogs (not shown) within the clamp which project radially inward to engage the shoulder 38 and which are pivotally mounted to enable insertion of the free end of the stiffener body 26. The clamp 100 has an opening 102 for receiving a pulling line (not shown) and enables the protection assembly 10 to be pulled into position by means of the line. It is releasable, so that it can be disengaged from the assembly once it is in position. This can be achieved using some form of weak link. For example, the internal mechanism of the clamp 100 may incorporate a weak link such as a shear pin to release when line tension exceeds some predetermined value, and breakage of the weak link may release the aforementioned dogs to pivot away from the shoulder 38 and so release the device. In this case the shear pin can be contained within the clamp to ensure that it is not left behind in the installation as a potential source of damage to working parts. An alternative is to provide a release mechanism which is remotely controllable so that an operator initiates the release. This may for example be a hydraulic mechanism to which pressure is applied through a hydraulic line leading to an operating station. An electric release mechanism could also serve the purpose.

In other embodiments the clamp 100 may engage frictionally with the end of the protection assembly 10. For example, it may comprise a sleeve adapted to fit over the assembly's end in the manner of a pen lid, and to pull when a predetermined force is applied by the pulling line.

The clamp 100 is provided internally with means for securing the cable which is to be protected. This may take the form of a "Chinese finger trap" (not seen in the drawings). Such devices are known and comprise a braided arrangement which embraces the end of the cable and is configured to grip. Pulling on the cable causes the trap to tighten its grip on the cable, ensuring a secure connection.

The clamp 100 is able to close free end 30 of the protection assembly 10 and thereby resist ingress of foreign bodies—sand, stones etc. This is important when the protection assembly is being drawn into position. The clamp 100 can also protect the free end of the protection assembly 10 from damage as it is pulled across the seabed, and can provide a rounded or faired shape well adapted to move across obstacles rather than snagging on them.

The process of installation of the cable 78 and the protection assembly 10 into a turbine leg 12 will now be described. In the preparation phase the protection assembly 10 is assembled. While assembly could be carried out on the deck of a support ship, an advantageous aspect of the present embodiment is that it lends itself to assembly on land and "reeling". That is, the pre-assembled protection assembly can be wound onto a reel and then fed off the reel when the support ship is in position. This can greatly simplify the installation process. The bend stiffeners used in the present embodiment have sufficient flexibility to lend themselves to reeling. In this respect they are to be contrasted with bend restrictors which, since they physically lock at a certain minimum bend radius, are less suited to reeling.

The cable itself can also be led into the protection assembly on land and reeled along with it, its end being secured to the clamp by the aforementioned Chinese finger trap.

The pulling line is arranged to run from a winch mounted at the turbine, out through the opening 16 in the turbine leg to the clamp 100, which is fitted to the internal bend stiffener 24. The protection assembly is dispensed from the shipborne reel into the water and at the same time is drawn toward the turbine leg 12 by the pulling line. The assembly forms an approximation of a catenary curve in the water, leading down from the support vessel and then upwards toward the opening 16 in the turbine leg 12, so that as the internal bend stiffener 24 and the retaining device 18 are drawn into the opening 16, they can be roughly aligned with it to ease their entry.

The protection assembly 10 may in this process be pulled across the sea bed, which is a potentially hostile environment especially as there may be rock dumps in the vicinity of the turbine leg 12.

When the stop collar 62 of the retaining device 18 meets the outer wall of the turbine leg 12 it prevents further advancement of the protection assembly 10 into the turbine leg. At this point the clamp 100 is released from the internal bend stiffener 24. In the case of a clamp with a weak link, this release is achieved by continuing to run the winch to draw in the pulling line, causing the weak link to break. In the case of a hydraulically operated clamp 100 the winch can be stopped and the clamp controlled to disengage.

At this point the balls 64 of the ball and ramp mechanism of the retaining device 18 have engaged the periphery of the opening 16. When the clamp 100 is released the weight of the protection assembly 10 tends to cause it to fall but this is resisted by the retaining device, which thus securely retains the assembly in place.

The cable remains secured to the clamp and by continuing to run the winch it can be drawn through the protection assembly 10 to bring the cable end to a connection point within the turbine. The clamp can then be detached from the cable, retrieved—it remains attached to the pulling line so this is straightforward—and re-used.

The process can be implemented without the assistance of divers, which is highly advantageous, since the environment is a potentially dangerous one for divers, particularly since water surges through the opening in the turbine leg 12 can create powerful local currents. Although the present embodiment has been described in relation to the type of installation in which cabling is passed through an opening in a wall of a turbine leg, it is also suited to use in "J" or "I" tube type installations. The retaining device 18 is well suited to engagement in a tube, although it may be desirable to provide the tube with circumferential grooves or other features to improve such engagement.

Figure 15:
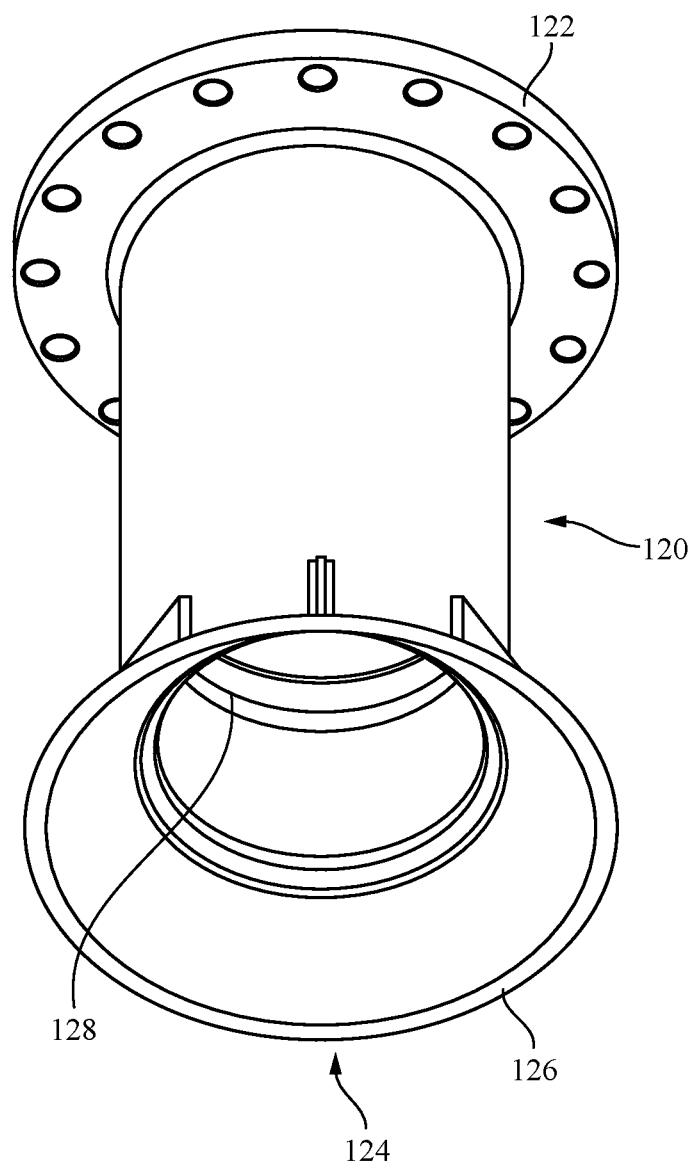
FIG. 15 is a view from beneath and one side of a J-tube adapted in accordance with an aspect of the present invention.
Figure 16:
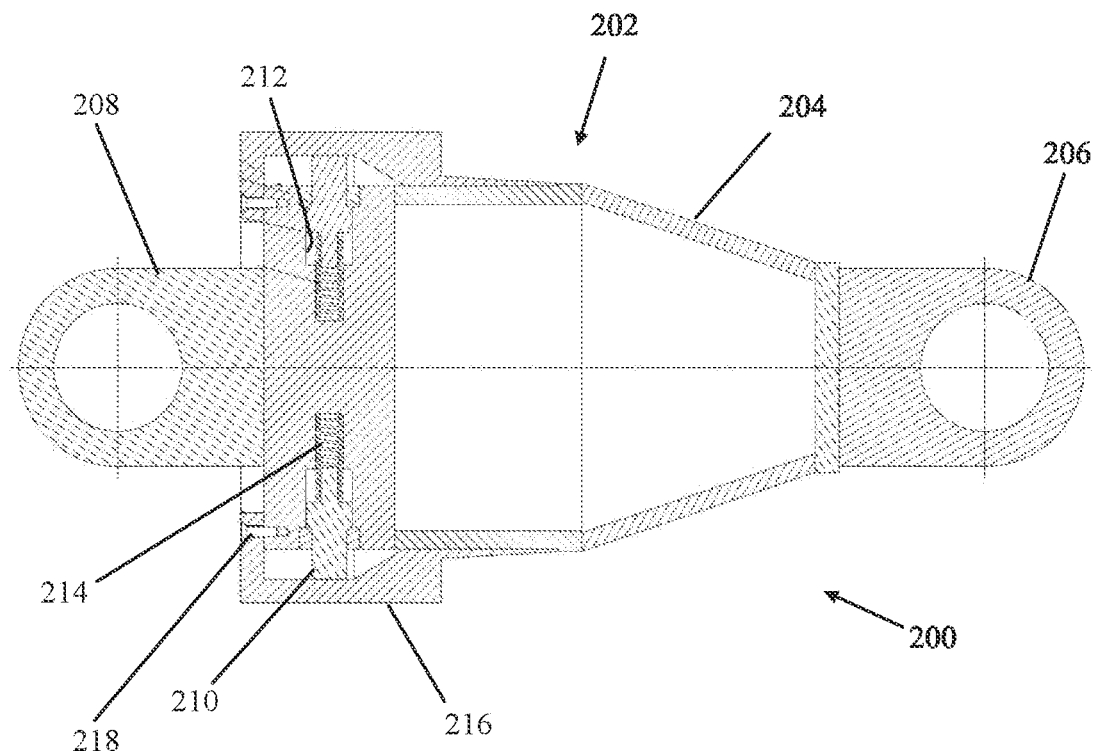
FIG. 16 is a section in a longitudinal plane through a removal tool in accordance with an aspect of the present invention.
Figure 17:
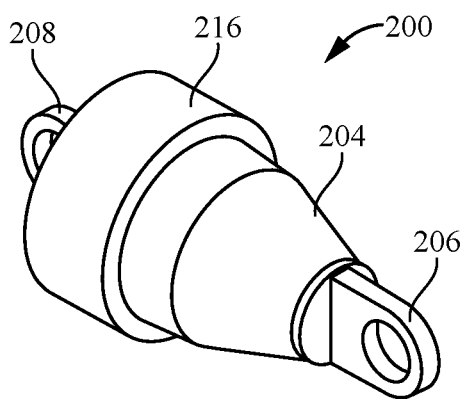
FIG. 17 is a further view of the removal tool.
Figure 18:
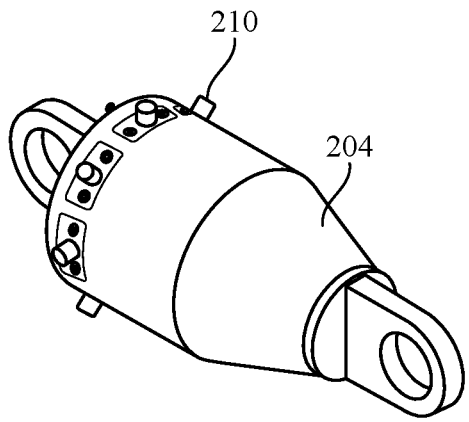
FIG. 18 is similar to FIG. 17 but omits a keeper part of the removal tool.
Figure 19:
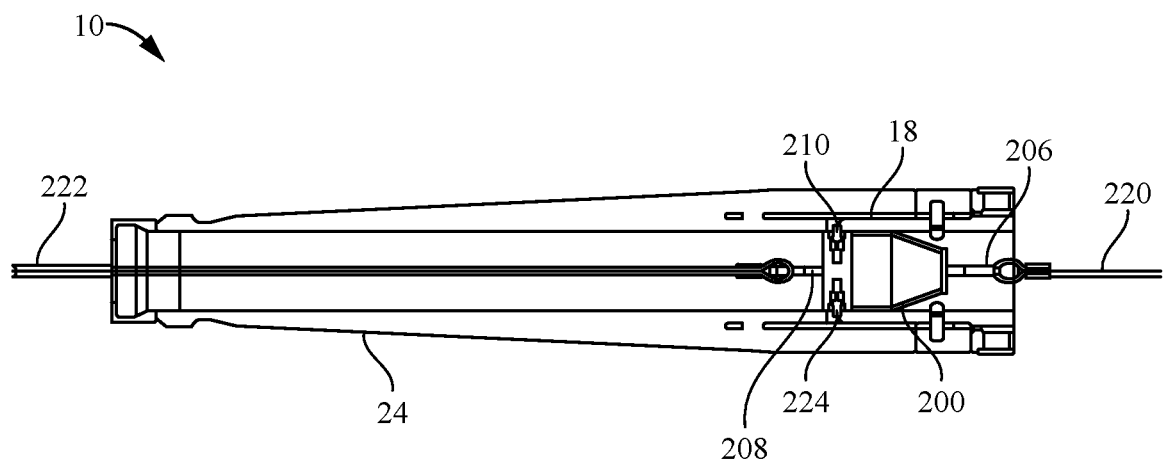
FIG. 19 is a section in a longitudinal plane through part of a protection assembly embodying the present invention and through the removal tool.

FIG. 15 represents a J-tube 120 having in this example a bolted flange 122 to secure it to the supporting structure. An open end 124 of the J-tube 120 is provided with a guide cone 126 forming a bell mouth to guide the protection assembly 10 into the tube. The J-tube 120 is provided with internal recesses, formed in this example as internal annular grooves 128 extending around the circumference of the tube, which are positioned and shaped to receive the locking balls 64 and so form a positive engagement with the protection assembly 10.

It may sometimes be necessary to release and remove the protection assembly 10 after it has been installed. This can, in accordance with aspects of the present invention, be effected in three different ways: (1) by pulling the protection assembly out of its mounting; (2) by actuating a release mechanism to free the protection assembly 10 from its mounting and (3) by destructive cutting, using a suitably equipped remotely operated vehicle (ROV) or other submersible equipment.

In order to carry out release method (1)—pulling the protection assembly 10 from its mounting—a pulling line needs to be attached to the assembly in a suitably secure manner. It is greatly preferable that this should be achieved without need for a diver or ROV to visit the submerged protection assembly 10. A removal tool 200 for this purpose is illustrated in FIGS. 16 to 19. The removal tool 200 is to be pulled into the protection assembly 10 and is configured to engage with it automatically, providing a secure anchor through which the assembly can be pulled from its mountings. Access is required at the top of the monopole to enable the removal tool 200 to be fed into the protection assembly 10.

The removal tool 200 comprises a tool body 202 having a front portion 204 which is frusto-conical and hence easily insertable into the protection assembly 10, and which incorporates a front padeye 206 and a rear padeye 208. The tool body 202 carries locking members 210 which serve in use to secure the removal tool 200 within the protection assembly 10. In the present embodiment the locking members take the form of keys 210 slidably and received in radial bores 212 and biased radially outwardly by biasing means in the form of helical springs 214 received in the said bores. Multiple such keys are provided at regular circumferential intervals around the cylindrical tool body 202. A releasable annular keeper housing 216 covers the keys 210 and retains them initially in retracted positions, enabling the removal tool 200 to be inserted into the protection assembly 10. The keeper housing 216 is initially secured to the tool body 202 by a suitable breakable coupling. In the present example this takes the form of breakable machine screws 218.

In use (see FIG. 19 in particular) a pulling line 220 led from a winch on a vessel is secured to the front padeye 206. A monopole winch wire 222 is secured to the rear padeye 208. The pulling line 220 is advanced to pull the removal tool 200 into the protection assembly 10 through its internal bend stiffener 24. The keeper housing 216 is too large in diameter to enter fully into the bend stiffener 24, so it is pulled from the tool body 202 as it advances, breaking the machine screws 218. The keys 210 are thus released and moved outwardly by their springs 214. As the tool body 202 continues to pass through the protection assembly 10, the keys 210 reach an internal recess 224 in its internal bore, bordered on one side by a shoulder on the end of the retaining device 18. The keys 210 move outwards into the recess 224, engaging against the said shoulder and so anchoring the tool body 202 securely with respect to the protection assembly 10. Tension applied to the pulling line 220 is thus transmitted to the protection assembly 10.

According to the present embodiment, the mechanism used to lock the protection assembly 10 in place incorporates a weak link, so that application of sufficient tension to the pulling line 220 breaks the weak link and releases the protection assembly 10 from its mounting. The weak link is not illustrated, but suitable devices are known to the skilled person. Force above a certain threshold breaks the weak link and frees the assembly for removal. The protection assembly 10 can then be recovered using the pulling line 220.

Figure 20:
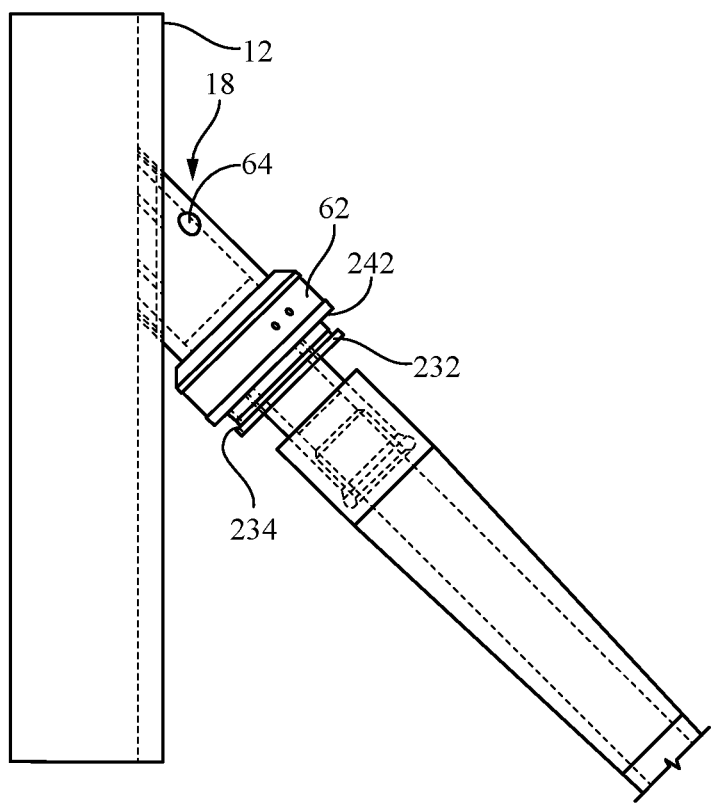
FIG. 20 depicts a protection assembly embodying the present invention mounted in a leg of a wind turbine.

Carrying out release method (2) referred to above—actuating the release mechanism—involves use of a release tool. Looking at FIG. 20, the retaining device 18 is seen to comprise a release collar 232 having an engagement shoulder 234 facing toward the stop collar 62. Moving the release collar 232 away from the stop collar 62 causes the locking balls 64 to retract and so releases the device from its mounting. The details of the internal mechanism of the retaining device 18 are known to the skilled person and are not depicted herein, but the movement referred to causes cages around the balls to move in a direction which moves the balls themselves along their respective ramps, causing their retraction. The release tool is used to move the release collar 232 away from the stop collar 62 to effect such release. The release tool itself is not depicted herein but can be a suitable hydraulically actuated device, able to be positioned using a remotely operated vehicle and to move the release collar 232 away from the stop collar 62.

The invention claimed is:

1. A protection assembly to be deployed underwater to protect an elongate member passing through an opening in a support structure, the protection assembly comprising:
   a first bend protection device,
   a second bend protection device, and
   a retaining device which is configured to be received in the opening in the support structure and to engage with the support structure to resist subsequent withdrawal from the support structure, the retaining device having a first end and a second end; and
   wherein the retaining device is provided with a first coupling element for coupling the first bend protection device to the first end of the retaining device and a second coupling element for coupling the second bend protection device to the second end of the retaining device, the second bend protection device including a moulded polymer body and the second coupling element being embedded therein during manufacture, the first coupling element being coupled to the first bend protection device through a mechanical fastener arrangement, enabling the first bend protection device to be coupled to the retaining device after manufacture, and the first and second coupling elements being formed by a mandrel passing through the retaining device.

2. The protection assembly as claimed in claim 1 further comprising:
an engagement feature provided on the first bend protection device and configured to be releasably grasped by a mechanical clamp to facilitate attachment of a pulling line to the protection assembly.

3. The protection assembly as claimed in claim 2, wherein the engagement feature includes a collar or upstand formed upon the first bend protection device.

4. The protection assembly as claimed in claim 2, wherein the first bend protection device includes a sleeve moulded in polymer, the engagement feature being an integral part of the sleeve.

5. The protection assembly as claimed in claim 1, wherein the retaining device includes
a retainer body for receipt in the opening in the support structure, the second coupling element being carried by the retainer body and movable axially outwardly and inwardly with respect to the retainer body,
an engagement member which projects from the retainer body and is movable radially inwardly and outwardly with respect to the retainer body to engage a periphery of the opening in the support structure, and
an engagement mechanism through which an axially outwardly directed force applied to the second coupling element gives rise to radially outwardly directed force upon the engagement member, so that pulling on the second coupling element urges the engagement member into engagement with the periphery of the opening to secure the retaining device in the support structure.

6. The protection assembly as claimed in claim 5, wherein the second coupling element is arranged to carry a weight of the second bend protection device following installation of the protection assembly, so that the weight pulls on the second coupling element and urges the engagement member outward.

7. The protection assembly as claimed in claim 1 further comprising an engagement feature configured to be releasably grasped by a mechanical clamp to facilitate attachment of a pulling line to the protection assembly.

8. The protection assembly as claimed in claim 7, wherein the mechanical fastener arrangement includes a locking dog.

9. A protection assembly to be deployed underwater to protect an elongate member passing through an opening in a support structure, the protection assembly comprising:
a first bend protection device,
a second bend protection device,
a retaining device which is coupled to the first and second bend protection devices and is configured to be received in the opening in the support structure and to engage with the support structure to resist subsequent withdrawal from the support structure, and
an engagement feature configured to be releasably grasped by a mechanical clamp to facilitate attachment of a pulling line to the protection assembly; and
wherein the retaining device has a first end and a second end and wherein the retaining device is provided with a first coupling element for coupling the first bend protection device to the first end of the retaining device and a second coupling element for coupling the second bend protection device to the second end of the retaining device,
wherein the second bend protection device includes a moulded polymer body and the second coupling element is embedded therein during manufacture,
wherein the first coupling element is coupled to the first bend protection device through a mechanical fastener arrangement, enabling the first bend protection device to be coupled to the retaining device after their manufacture,
wherein the mechanical fastener arrangement includes a locking dog, and
wherein the first and second coupling elements are formed by a mandrel passing through the retaining device.

* * * * *